Jan. 5, 1943.　　　　　F. VON OPEL　　　　　2,307,435
GASOLINE DISPENSING MECHANISM
Filed Sept. 17, 1940　　　2 Sheets-Sheet 1
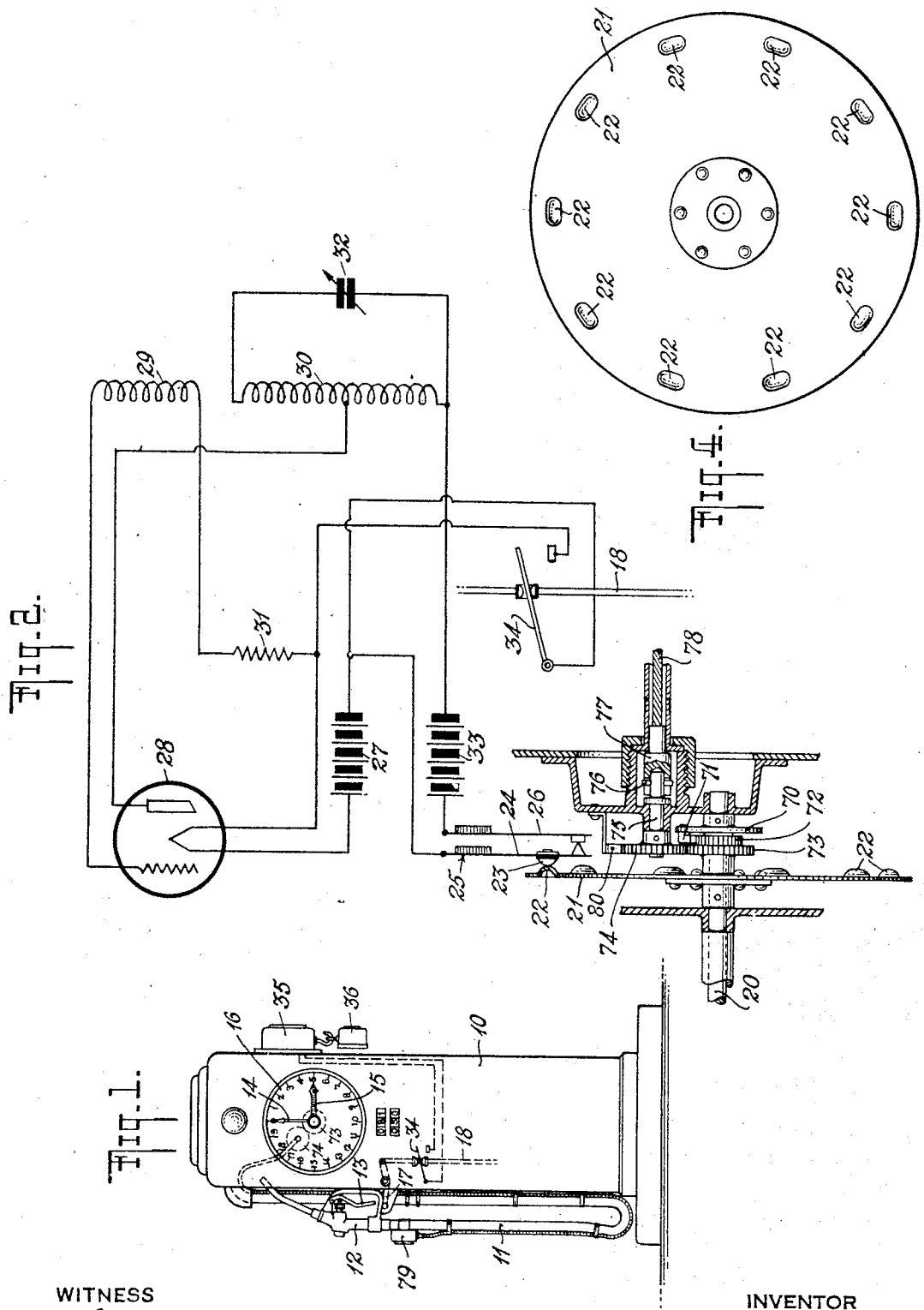
WITNESS
G. V. Rasmussen
INVENTOR
FRITZ VON OPEL
BY
Briesen & Schrenk
ATTORNEYS Jan. 5, 1943.  F. VON OPEL  2,307,435
GASOLINE DISPENSING MECHANISM
Filed Sept. 17, 1940   2 Sheets-Sheet 2
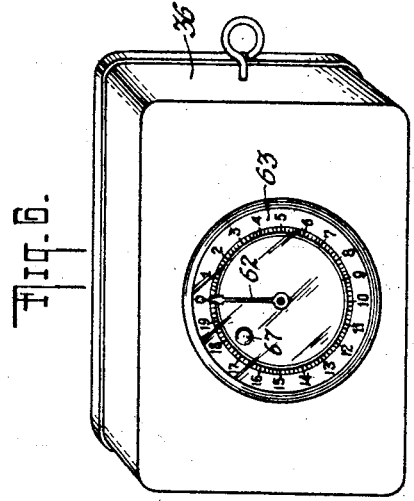
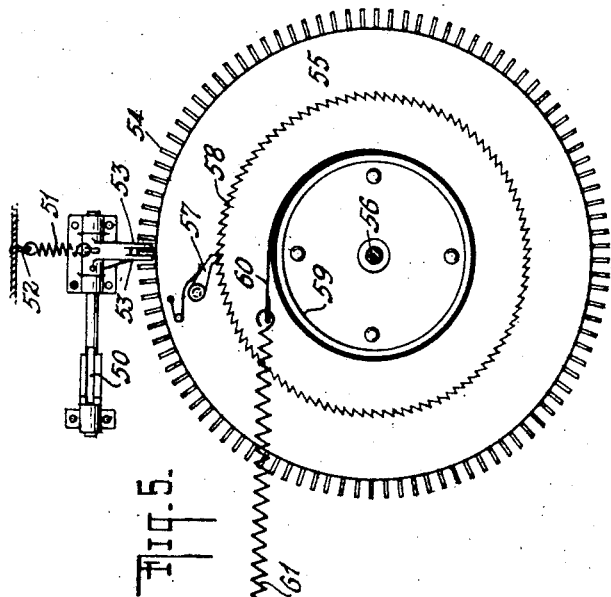
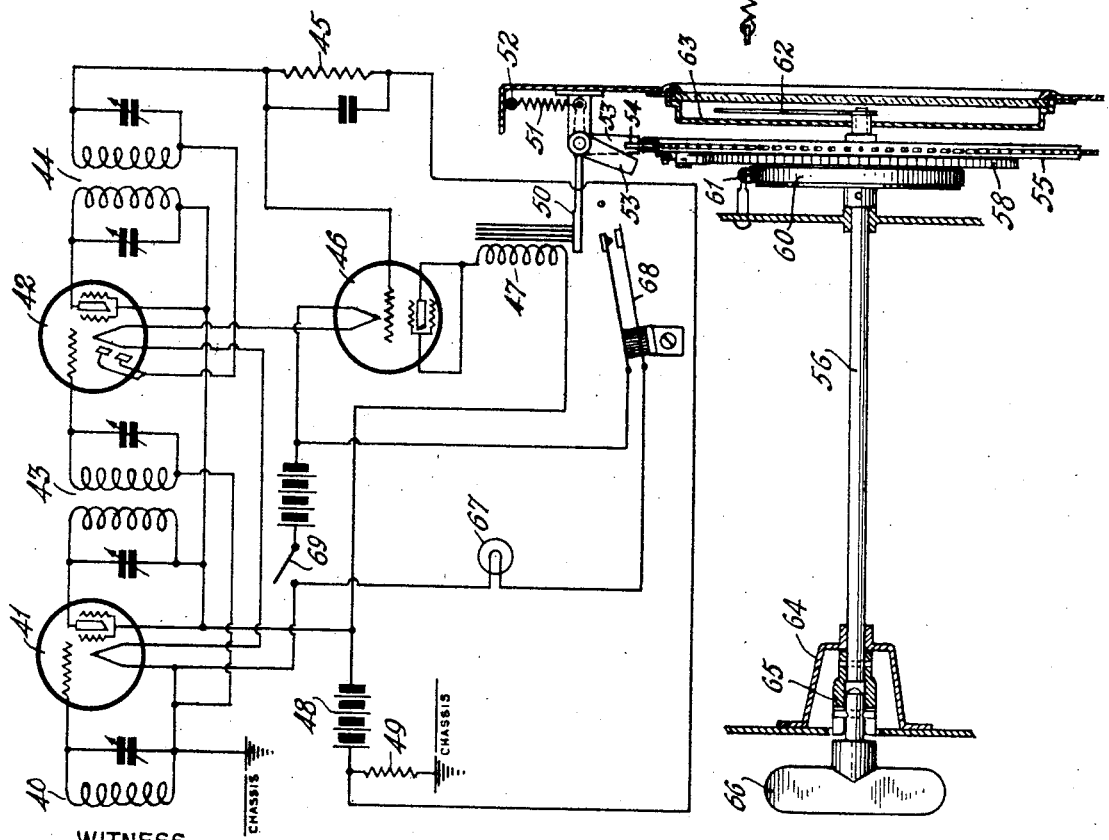
INVENTOR
FRITZ VON OPEL
BY
ATTORNEYS Patented Jan. 5, 1943

2,307,435

UNITED STATES PATENT OFFICE 2,307,435

GASOLINE DISPENSING MECHANISM

Fritz von Opel, Saint-Moritz, Switzerland; vested in the Alien Property Custodian Application September 17, 1940, Serial No. 357,110

5 Claims. (Cl. 73—198)

This invention relates generally to registering mechanism and more particularly to registering mechanism for use in connection with meters for dispensing gasoline and other oils.

The object of the invention is to provide a practical registering means which will give an accurate reading of the gasoline dispensed by the meters at a place spaced from the latter and without the necessity of reading the metering mechanism on the pump.

A further object of the invention is the provision of registering means separate from and controlled from mechanism incorporated in the pump which may be handed to the purchaser while seated in his automobile and which will acquaint him with the exact amount of gasoline which is being pumped into his automobile without the necessity of his leaving the latter or attempting to read the metering mechanism on the pump.

Further objects as well as the advantages and novel features of the invention, will become apparent from a perusal of the following detailed description of the invention, read in connection with the accompanying drawings, which show for the purposes of illustration one embodiment which the invention may assume in practice. In the drawings, Fig. 1 is a front elevational view of a gasoline pump equipped with one form of the present invention; Fig. 2 shows a portion of the transmitting mechanism in the pump together with a suitable electrical means for controlling the operation of the registering unit to be handed the purchaser; Fig. 3 illustrates the mechanical and electrical construction of the separate receiving unit; Fig. 4 is a front elevational view of the disc member which controls the electrical means in the pump; Fig. 5 is a rear elevational view of a portion of the registering means in the portable unit and Fig. 6 is a front perspective view of the portable registering unit.

In Fig. 1 of the drawings, there is illustrated a typical gasoline dispenser having the usual housing 10 for enclosing the instrumentalities which are well-known in the art and which include a fluid meter arranged to receive gasoline from a suitable supply source and to deliver it to the usual dispensing hose 11 provided with a valved nozzle 12. As is usual, the nozzle 12 may be provided a lever 13 which is operable to open and close the valve in the nozzle to control the supply of gasoline. During a dispensing operation, the fluid meter, through a connecting shaft, operates a register which visibly indicates the quantity of gasoline dispensed. The registering or metering mechanism is of common design and the indicator hands 14 and 15 of the registering mechanism are actuated in such fashion that a unit volume say, for example, one gallon, causes a complete clockwise rotation of the hand or pointer 14 in front of a suitable graduated dial 16 while the mating hand or pointer 15 is moving in the same rotational direction from one graduation to the next highest in order. The graduations on the dial 16, as is usual, designate gallons and may register up to twenty gallons as is illustrated in Fig. 1 of the drawings. At the end of a dispensing operation, the mechanism of the register may be restored to a zero reading by suitable set-back mechanism which may be manually operated. The liquid supply to the fluid meter may be discontinued at the will of the operator through the operation of a lever 17 pivotally mounted in the housing 10 and one end of which protrudes from the housing and is depressible to raise a rod 18 secured to the inner end thereof. The rod 18 may lead to a suitable valve control such as a switch or valve for controlling the fluid supply.

In accordance with the present invention there is mounted on the main indicator shaft 20 of the registering mechanism within the dispenser housing 10 a disc 21 which is arranged to rotate with the pointer 14 and which is provided around its peripherial edge portion with a plurality of equally spaced projections 22. The projections 22 may be attached to the plate 21 in any suitable fashion or may be formed out of the material of which the plate 21 is constituted by means of a stamping operation as is illustrated in Fig. 2 of the drawings. Preferably also there are provided ten equally spaced projections indicating tenths of a gallon although the number of projections can be varied and will depend upon the units of volume of the gasoline which are to be indicated. During the rotational movement of the plate 21 the projections 22 come into engagement with a projection or contact member 23 provided on the flexible arm 24 of a switch 25 and through such engagement cause the electrical contact carried by the arm 24 to engage with the electrical contact provided on the arm 26 of the switch. The closing of the switch 25 closes a conventional oscillator circuit which may include a battery 27, a triod amplifier tube 28 and an oscillator coil composed of a grid coil 29 and a plate coil 30. Connected in series with the grid coil 29 and the filament of the triod tube 28 is a resistance 31 of about 500 ohms. Connected in parallel with the plate coil 30 is a tuning condenser 32. Intermediate the oscillator coil and the switch 25 is a B-battery 33 of from 50 to 75 volts. The operativeness of this circuit may also be controlled by a switch 34 which may be either manually operated by the salesman or automatically controlled in more suitable fashion to set the circuit for operation as soon as the gasoline is being pumped or just prior thereto. For example, the operation of switch 34 may be controlled by the position of the pivoted lever 17 which controls the supply of gasoline to the fluid meter. In this case the switch may be suitably connected to the rod 18, as is illustrated in Figs. 1 and 3 of the drawings, so that when the nozzle 12 is resting on the projecting arm of the lever 17, the switch 34 is held in its inoperative or off position, while when the nozzle is removed, the lever 17 may be raised manually by the operator, thus throwing the switch 34 to its operative position and causing the circuit to be placed in a condition for immediate operation.

It will be evident from the foregoing that when the switch 34 is closed and gasoline is being pumped, the rotation of the disc 21 on the main indicator shaft 20 of the registering mechanism causes the projections 22 on such disc or plate to successively come into engagement with the projection 23 on the switch 25. As there are ten projections 22 on the plate 21, the projections will close the switch 25 ten times while the shaft 20 and pointer 14 are making one complete revolution, or while one gallon of gasoline is pumped by the gasoline dispenser. The circuit controlled by the switch 25 is thus actuated every time a tenth of a gallon of gasoline is pumped into an automobile by the pump dispensing device to cause the oscillator coil to send out a radio signal. The projections 22 of the plate 21 are preferably elongated, as shown in Fig. 4 of the drawings, to cause the impulse sent out by the oscillator coil to be of a predetermined duration. The energy emitted by the oscillator coil should have a fixed wave of any predetermined frequency, such for example, a long wave order of 400 kilocycles. The several elements of the transmitter circuit may be contained within the housing of the gasoline dispenser 10, but the oscillator coil is preferably contained in a housing or casing 35 mounted on the exterior of the dispenser as is illustrated in Fig. 1 of the drawings. The casing 35 may be closed on one side by a screen and should preferably be so positioned that the electro-magnetic field set up each time the transmitter is operated will enclose an automobile parked at the dispenser.

The impulses or signals sent out by the oscillator coil are picked up by a receiving unit which is handed to the driver of the automobile prior to the dispensing of the gasoline. As is illustrated in Figs. 1 and 6 of the drawings, the receiving unit includes a casing 36 which when not in use may be attached to a hook provided on the transmitter casing 35. Within the casing 36 is contained a radio receiving set of any well-known form capable of picking up the signals sent out by the transmitter. In Fig. 3 of the drawings is illustrated a typical receiving circuit suitable for the purposes of the invention and including a loop coil or antenna 40 which may be attached to one interior surface of the casing 36 as is usual. The energy picked up by the antenna 40 is amplified by a radio frequency pentode tube 41, a radio frequency pentode and diode rectifier tube 42 and their associated radio frequency transformer coils 43 and 44. The signal coming out of the secondary of the coil 44 is rectified by the diodes incorporated in the diode pentode tube 42 and the rectified voltage appears across a resistor 45 having a resistance of one megohm. Also connected in series with the tubes 41 and 42 is an output tube 46, the three tubes being preferably one volt tubes. Connected in series with the plate circuit of the output tube 46 is a relay 47 which is capable of being actuated by a current of 3 to 4 milliamperes. The coil of the relay 47 is connected in series with the B battery 48, the receiver circuit being grounded on the chassis on one side of the battery 48 by means of a resistor 49 having a resistance of approximately 15 ohms. In a unit of this type 70 volts of battery is sufficient for the B battery while a battery of 4½ volts may be used for the filament supply of the tubes 41, 42 and 46 whose filaments are in series.

It will be understood from the foregoing that when no energy is furnished to the antenna 40, the bias on the output tube 46 is the voltage drop of the filaments of tubes 41 and 42 and the voltage drop across the resistor 49. When, however, a signal is received by the antenna 40, the energy picked up is amplified by tubes 41 and 42 and their associated coils 43 and 44 and the rectified voltage appears across the resistor 45 to change the bias of tube 46 to more negative by the amount of voltage across resistor 45. Thus no current will flow through the plate circuit of tube 46 and the coil of the relay 47 which causes the magnet of the relay to release its magnetic hold on a pivoted member 50.

The member 50 is pivoted intermediate its ends in the casing 36 and is normally biased to opened position away from the magnet of the relay 47 by means of a spring 51 which is attached at one end to an end of the pivoted member and at its other end to a bolt or pin 52 secured to one of the walls of the casing 36. The pivoted member 50 is provided at its axis of rotation with an escapement device consisting of two depending angularly disposed plates 53, 53 which engage with a series of teeth 54 provided on the rim of a wheel 55 rotatably mounted on a shaft 56 extending transversely through the casing 36. Provided on the wheel 55 is a spring pressed pawl 57 which engages with the teeth of a ratchet wheel 58 fixedly secured to the shaft 56. Also secured to the shaft 56 is a drum 59 biased to rotate in a counter-clockwise direction, as viewed in Fig. 5, by means of a spring 61 which is secured at one end to a wall of the casing and at its other end to one end of a band 60 which engages the peripherial surface of the drum and is connected thereto at its other end.

It will be seen from the foregoing that when a signal or radio impulse is received by the loop coil 40, the pivoted member 50 is caused to break its contact with the relay 47, as has been explained, and to pivot away from the relay under the influence of the spring 51. The pivotal movement of the member 50 in this direction causes one of the depending plates 53 of the escapement device to free the tooth 54 of the wheel 55 which is intermediate such plates and thereby enable the wheel 55 under the tension of spring 61 through drum 59, ratchet wheel 58 and pawl 57 to rotate an amount to bring the next succeeding tooth 54 up against the other plate 53 which has been moved by such pivotal movement of the member 50 into the path of movement of the teeth 54. When the signal has been completed, the member 50 is again attracted by the magnet of the relay 47 to bring the plates 53, 53 of the escapement device back in their initial position, the wheel 55 during this period completing its rotation under the tension of spring 61 to bring the next succeeding tooth 54 intermediate the plates 53, 53. The shaft 56 is provided on its forward end with an indicator or pointer 62 which cooperates with a dial face 63 to indicate the number of times that a signal has been received by the loop coil 40 of the receiving unit, the graduations on the dial face 63 designating fifths of a gallon as is indicated in Fig. 6 of the drawings. As the dial face is graduated to indicate twenty gallons, the wheel 55 is provided with 200 teeth so that it will take 200 step-by-step movements to complete one revolution of such wheel. The shaft 56 is pivotally mounted at its other end on bearing bracket 64 which is secured to an adjacent wall of the casing 36 and within the confines of such bracket is provided with a coupling member 65 having a slotted end adapted to be engaged by the oppositely disposed pins of a key 66. Thus by inserting the pins of the key 66 into the slots of the coupling member 65, the shaft 56 may be rotated in the opposite direction to bring the reading of the pointer 62 back to zero and to restore the tension of the spring 61 so that on subsequent dispensing operations the spring will be enabled to rotate the drum 59 and consequently shaft 56 and indicator 62 to make a proper reading when impulses are received by the antenna 40. The spring pressed pawl connection between ratchet wheel 58 and wheel 55 permits of such rewinding of the spring 61 without disturbing the position of wheel 55 with relation to the plates 53, 53 of the escapement device. Preferably this operation of restoring the pointer or indicator 62 to a zero reading is accomplished just before handing the receiver 36 to a customer and while the control switches 34 and 69 in both circuits are closed and the pointer 14 of the pump 10 brought to a zero reading. The relay 47 in the receiver will then be in a condition where the member 50 will have broken its contact with the magnet thereof under the influence of the spring 51. When the lever 13 is then actuated the engagement of the projection 22 with switch 25 is broken to cause the member 50 to move out of engagement with the magnet of the relay 47. As soon as the next succeeding projection closes the switch 25 and renders the relay 47 inoperative to hold the member 50, the cycle of operation of the member 50 will have been completed and the pointer 62, through the described escapement mechanism connecting such pointer with the member 50, will register a tenth of a gallon. Thus a tenth of a gallon will be registered by the indicator 62 every time a projection 22 comes into engagement with the switch 25.

It will be observed that the present invention provides a simple and inexpensive means which can be readily installed in present dispensing pumps and which is entirely practical for the purposes for which it is intended. When a customer drives up to the pump, the attendant hands him the receiver unit 36 which, as has been above described, has been readied to receive the signals from the transmitter unit and to indicate the amount of gasoline dispensed. Thus as the attendant pumps the gasoline into the purchaser's automobile, the transmitter will be caused to send out signal impulses of preferably a predetermined long wave frequency for every tenth of a gallon pumped into the hose 11. The successive signal impulses are picked up by the receiver held by the purchaser and such signals cause the pointer 62 on such unit to move in a step-by-step fashion from one graduation to the next highest in order thereby letting the purchaser know at any moment how much gasoline has been pumped into his automobile without the necessity of him leaving it or trying to look at the registering mechanism on the dispensing pump, which is almost always out of view to the occupant of the car. The receiving unit is compact and light and can be produced at low cost. If desired, a totalizer can be utilized in the receiver unit instead of the registering mechanism disclosed or may be used in addition to the indicator 62 to indicate the cost of the gasoline pumped into the customer's car. Also, it may be found advisable to provide a small lamp in the receiver unit to apprise the customer by light signals of the quantity of gasoline being pumped into his automobile. This may be accomplished, for example, by providing a small light 67 in the dial face 63 of the unit and including it in parallel with the filament circuit of the tubes 41, 42 and 46, as is illustrated in Fig. 3 of the drawings. The operation of the lamp 67 may be controlled by a switch 68 which is arranged to be closed by the pivoted member 50 every time a signal impulse is received by the receiving unit 36. After the customer has received the amount of gasoline desired, the attendant can hang the receiver unit 36 on the hook provided on the transmitter casing 35. He may also at the end of such operation open the control to render the unit inoperative until it is to be used again.

For the convenience of the attendant, registering mechanism may also be associated with the nozzle 12 of the hose to inform him of the amount of gasoline being dispensed without requiring him to walk back into the view of the pump dial during the dispensing operation. This may be accomplished by providing the shaft 20 of the registering mechanism in the dispensing pump with a wheel 70 carrying a spring pressed pawl 71 arranged to engage with the teeth of a ratchet wheel 72 integrally formed with a gear 73 which is rotatably mounted on the shaft 20, as is illustrated in Fig. 2 of the drawings. The gear 73 may mesh with a gear 74 provided on one end of a stub shaft 75, the other end of such shaft being provided with a transverse pin 76 whose ends are positioned in the slotted end of a coupling member 77 attached to one end of a flexible shaft 78. The casing of the shaft 78 is attached to the hose 11 and extends to the outer end of the hose to a point adjacent the nozzle 12, as is shown in Fig. 1 of the drawings. The outer end of the shaft 78 is connected to a totalizer 79 adapted to register every complete rotation of the shaft 78 and which is preferably provided with means to set it back to zero after every dispensing operation. It will thus be seen that as the shaft 20 makes a complete rotation, gears 73 and 74 which are of like diameter in order that the rotational movement of shaft 20 is transmitted to shaft 78 in the same ratio, will rotate and through the flexible shaft 78 cause the totalizer 79 to be actuated. The totalizer may register tenths of a gallon as the shaft 78 rotates or may register one gallon at the end of each complete revolution of the shaft 78. It will also be observed that the arrangement of these parts are such that the registering instrumentalities of the pump dispenser register may be restored to zero at the end of a dispensing operation without causing shaft 78 to rotate in the opposite direction. In order to prevent any rotational movement of the shaft 78 sufficient to cause an inaccurate reading of the totalizer 79 as a result of this set-back operation, a spring brake 80 may be arranged to engage the teeth of gear 74, as is illustrated in Fig. 2 of the drawings.

While I have described and illustrated one embodiment in which the invention may be utilized, it is not intended that the invention be limited to the use of the several elements herein disclosed, as obviously the objects of the invention may be attained in numerous ways by a skilled mechanic and without departing from the spirit and scope of the invention, as set forth in the following claims.

I claim:

1. In combination, a fluid dispensing device having a rotatable member arranged to be rotated an amount proportional to the flow of fluid through the dispensing device, a first indicator associated with said device and actuated by said member, a radio wave signal transmitter tuned to a predetermined wave frequency associated with said device, electrical controlling means for starting and ending transmission by said transmitter of a wave signal, mechanical means operatively connected with said rotatable member for successively actuating said controlling means while said member rotates during a dispensing operation, each actuation to occur after a predetermined amount of fluid has been dispensed, and a portable unit adapted to be positioned on a place spaced from said dispensing device during the dispensing operation, said unit including a second indicator of the amount of fluid dispensed, electromagnetic means for stepping said indicator into successive indicating positions, and means responsive to the wave signal when transmitted for actuating said electromagnetic means.

2. In combination, a fluid dispensing device having a rotatable member arranged to be rotated an amount proportional to the flow of fluid through the dispensing device, a first indicator actuated by said member for indicating on said device the amount dispensed during a dispensing operation, a radio wave signal transmitter tuned to predetermined wave frequency associated with said device, electrical controlling means associated with said transmitter for starting and ending the transmission by it of a wave signal, mechanical means operatively connected with said rotatable member for successively actuating said controlling means while said member rotates during a dispensing operation, each actuation to occur after a predetermined amount of fluid has been dispensed, said successive amounts being equal, and a portable unit adapted to be positioned at a place spaced from said dispensing device during the dispensing operation to bring about another indication of the amount of fluid dispensed, said unit including a second indicator of the amount of fluid dispensed, a source of electric current and electromagnetic means energized by said source for operating said indicator, and means responsive to the wave signal when transmitted for actuating said electromagnetic means.

3. In combination, a fluid dispensing device having a rotatable member arranged to be rotated an amount proportional to the flow of fluid through the dispensing device, a visual indicator actuated by said member and associated with said device to indicate the amount of fluid dispensed during a dispensing operation, a radio wave signal transmitter tuned to a predetermined wave frequency associated with said device, electrical contact means associated with said transmitter for controlling the transmission by it of a wave signal, an element operatively connected with said rotatable member arranged to mechanically actuate said contact means at predetermined intervals while said member and element rotate during a dispensing operation, each interval corresponding to a predetermined amount of fluid dispensed, and a portable unit adapted to be positioned at a place spaced from said dispensing device during a dispensing operation, said unit including another indicator of the amount of fluid dispensed, electromagnetic means for operating said indicator, and means responsive to the wave signal when transmitted for actuating said electromagnetic means.

4. In combination, a fluid dispensing device having a rotatable member arranged to be rotated an amount proportional to the flow of fluid through the dispensing device, a first indicator associated with said device and operatively connected with said rotatable member for visually indicating the amount of fluid dispensed during a dispensing operation, a radio wave signal transmitter tuned to a predetermined wave frequency associated with said device, electrical contact means associated with said transmitter for controlling the transmission by it of a wave signal, rotatable mechanical means associated with and driven by said rotatable member for successively actuating said contact means while said member rotates during a dispensing operation, each actuation to occur after a predetermined amount of fluid has been dispensed, said amounts of fluid being equal, and a portable unit adapted to be positioned at a place spaced from said dispensing device during a dispensing operation, said unit including another visual indicator of the amount of fluid dispensed by said device during a dispensing operation, said latter indicator having a zero and successive indicatory positions, power storing means as exemplified by a spring arranged to move said indicator successively into said indicatory positions, an escapement device for controlling the movement of said power driven indicator, electromagnetic means for controlling said escapement device, means responsive to the wave signal when transmitted for actuating said electromagnetic means and thereby said escapement device for permitting said indicator to move one step each time a wave signal is being received, and mechanical means for restoring power to said power storing means as exemplified by a rewinding member for the spring, said mechanical means also adapted to restore said indicator to its zero position.

5. In combination, a fluid dispensing device including valve means for starting and ending a flow of fluid to be dispensed, a rotatable member arranged to be rotated an amount proportional to the flow of fluid through the dispensing device when said flow is started by operating said valve means, a first indicator associated with said device and operatively connected with said member, a radio wave signal transmitter tuned to a predetermined wave frequency associated with said device, first electrical contact means associated with and controlled by said valve means for energizing said transmitter during a dispensing operation, second electrical contact means associated with the transmitter for controlling the transmission by it of a wave signal, mechanical means driven by said rotatable member for successively actuating said second contact means while said member rotates during a dispensing operation, each actuation to occur after a predetermined amount of fluid has been dispensed, successive predetermined amounts of fluid being equal, and a portable unit adapted to be positioned at a place spaced from said dispensing device during a dispensing operation, said unit including another indicator, a source of power exemplified by a spring for operating said indicator, an escapement device for controlling the operation of said indicator, electromagnetic means for actuating said escapement device, and means responsive to a wave signal when transmitted for actuating said electromagnetic means and thereby operating said escapement device to permit movement of said indicator by said source of power.

FRITZ VON OPEL.